(12) United States Patent
Maie et al.

(10) Patent No.: US 8,437,068 B2
(45) Date of Patent: May 7, 2013

(54) OPTICAL MODULATOR

(75) Inventors: Takuji Maie, Kashiwa (JP); Tokutaka Hara, Funabashi (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 13/431,298

(22) Filed: Mar. 27, 2012

(65) Prior Publication Data

US 2012/0250136 A1     Oct. 4, 2012

(30) Foreign Application Priority Data

Mar. 28, 2011  (JP) .................................. 2011-069333

(51) Int. Cl.
  *G02F 1/01*   (2006.01)
  *G02F 1/29*   (2006.01)
  *G02B 26/08*  (2006.01)

(52) U.S. Cl.
  USPC ........................... 359/279; 359/298; 359/301

(58) Field of Classification Search ................. 359/237, 359/238, 245–247, 259, 264, 279–283, 298, 359/301–304, 485.01, 485.06, 487.01, 487.04, 359/489.14, 492.01, 618, 629, 634; 385/4–10, 385/31, 33–36, 39
See application file for complete search history.

(56) References Cited

U.S. PATENT DOCUMENTS 7,568,365 B2 * 8/2009 Schaffer et al. ................ 65/377
2012/0136238 A1 * 5/2012 Milner .......................... 600/411

FOREIGN PATENT DOCUMENTS

JP    A-2001-036505    2/2001

* cited by examiner

*Primary Examiner* — Thomas K Pham
*Assistant Examiner* — Brandi Thomas
(74) *Attorney, Agent, or Firm* — Merchant & Gould P.C.

(57) ABSTRACT

The optical modulator includes an optical waveguide element in which a first waveguide is formed obliquely to an outgoing end surface, and a second waveguide is formed obliquely to both the first waveguide and the outgoing end surface, a lens which makes parallel optical paths of first and second modulated light beams outgoing from the first and second waveguides, a phase delay element which applies a phase delay to at least one of the first and second modulated light beams, a polarization beam rotating unit which rotates at least one polarized wave of the first and second modulated light beams to make the polarized waves orthogonal to each other between the two modulated light beams, and a polarization beam combining element which combines the first and second modulated light beams whose polarized waves are made orthogonal to each other.

5 Claims, 2 Drawing Sheets

OPTICAL MODULATOR

This application claims the benefit of priority to Japanese Patent Application No. 2011-069333, filed 28 Mar. 2011, which is incorporated herein by reference in its entirety.

FIELD OF THE INVENTION

The present invention relates to an optical modulator.

BACKGROUND

As a transmission system which can increase a transmission capacity of an optical communication system, Japanese Unexamined Patent Application Publication No. 2001-036505 describes a system which makes polarized waves orthogonal to each other between light pulses corresponding to adjacent bits on a time axis, such that polarization multiplexing is used together with time-division multiplexing. Specifically, a multiplexing optical circuit described in Japanese Unexamined Patent Application Publication No. 2001-036505 is configured to make polarized waves of two separately modulated light beams orthogonal to each other, to apply a time delay half the pulse interval of each modulated light beam between the two modulated light beams, and to then perform polarization combine. According to this system, polarized waves are made orthogonal to each other between adjacent bits, such that interference of light pulses does not occur. For this reason, even if the waveforms of the light pulses temporally overlap, there is little influence on the transmission characteristics. Accordingly, it is possible to increase the transmission capacity without depending on a method of narrowing the light pulses.

In the configuration of Japanese Unexamined Patent Application Publication No. 2001-036505, only with the use of an optical path difference between two polarized waves (modulated light beams) in a birefringent crystal which performs polarization combine, the above-described time delay necessary for polarization multiplexing and time-division multiplexing is generated between the two modulated light beams. On the other hand, since the time delay is determined at the bit rate of the system, it is difficult to freely select the optical path difference in the birefringent crystal, consequently, the length (the crystal thickness in the light propagation direction) of the birefringent crystal. For this reason, it is necessary to use a comparatively large type as the birefringent crystal, causing a problem in that the apparatus may not be reduced in size.

SUMMARY OF THE INVENTION

The invention has been finalized in consideration of the above-described situation, and an object of the invention is to reduce the size of an optical modulator which makes polarized waves orthogonal to each other between light pulses corresponding to adjacent bits on a time axis.

The invention has been finalized in order to solve the above-described problem. An aspect of the invention provides an optical modulator which makes polarized waves orthogonal to each other between light pulses corresponding to adjacent bits on a time axis. The optical modulator includes first and second light modulation unit which are driven with the same modulation frequency, an optical waveguide element which has a first waveguide through which a first modulated light beam by the first light modulation unit propagates and a second waveguide through which a second modulated light beam by the second light modulation unit propagates, the first waveguide being formed obliquely to an outgoing end surface, and the second waveguide being formed obliquely to both the first waveguide and the outgoing end surface, a lens which makes parallel optical paths of the first modulated light beam outgoing from the first waveguide and the second modulated light beam outgoing from the second waveguide, a phase delay element which applies a phase delay to at least one of the first and second modulated light beams, a polarization beam rotating unit which rotates at least one polarized wave of the first and second modulated light beam to make the polarized waves orthogonal to each other between the two modulated light beams, and a polarization beam combining element which is provided at the back of the lens, and combines the first modulated light beam and the second modulated light beam whose polarized waves are made orthogonal to each other. The thickness of the phase delay element in the light propagation direction is set to a thickness at which a light pulse of the first modulated light beam and a light pulse of the second modulated light beam by a phase difference due to the phase delay element and a phase difference due to the polarization beam combining element are bit-interleaved.

In the optical modulator, the phase delay element may have a flat plate shape and may be configured to adjust the inclination angle of the normal of the flat plate relative to the light propagation direction.

In the optical modulator, the thickness of the polarization beam combining element in the light propagation direction may be set to be greater than a thickness corresponding to a minimum allowable value of polarization crosstalk on the combined beam between the first and second modulated light beams.

The optical modulator may further include a unit in which the optical waveguide element and the lens are fixed in a first housing, and a unit in which the phase delay element, the polarization beam rotating unit, and the polarization beam combining element are fixed in a second housing along with an output optical fiber.

The optical modulator may further include a unit in which the optical waveguide element, the polarization beam rotating unit, and the phase delay element are fixed in a first housing, and a unit in which the lens and the polarization beam combining element are fixed in a second housing along with an output optical fiber.

According to the aspect of the invention, it is possible to reduce the size of an optical modulator which makes polarized waves orthogonal to each other between light pulses corresponding to adjacent bits on the time axis.

DETAILED DESCRIPTION OF THE INVENTION

Hereinafter, an embodiment of the invention will be described in detail with reference to the drawings.

Figure 1:
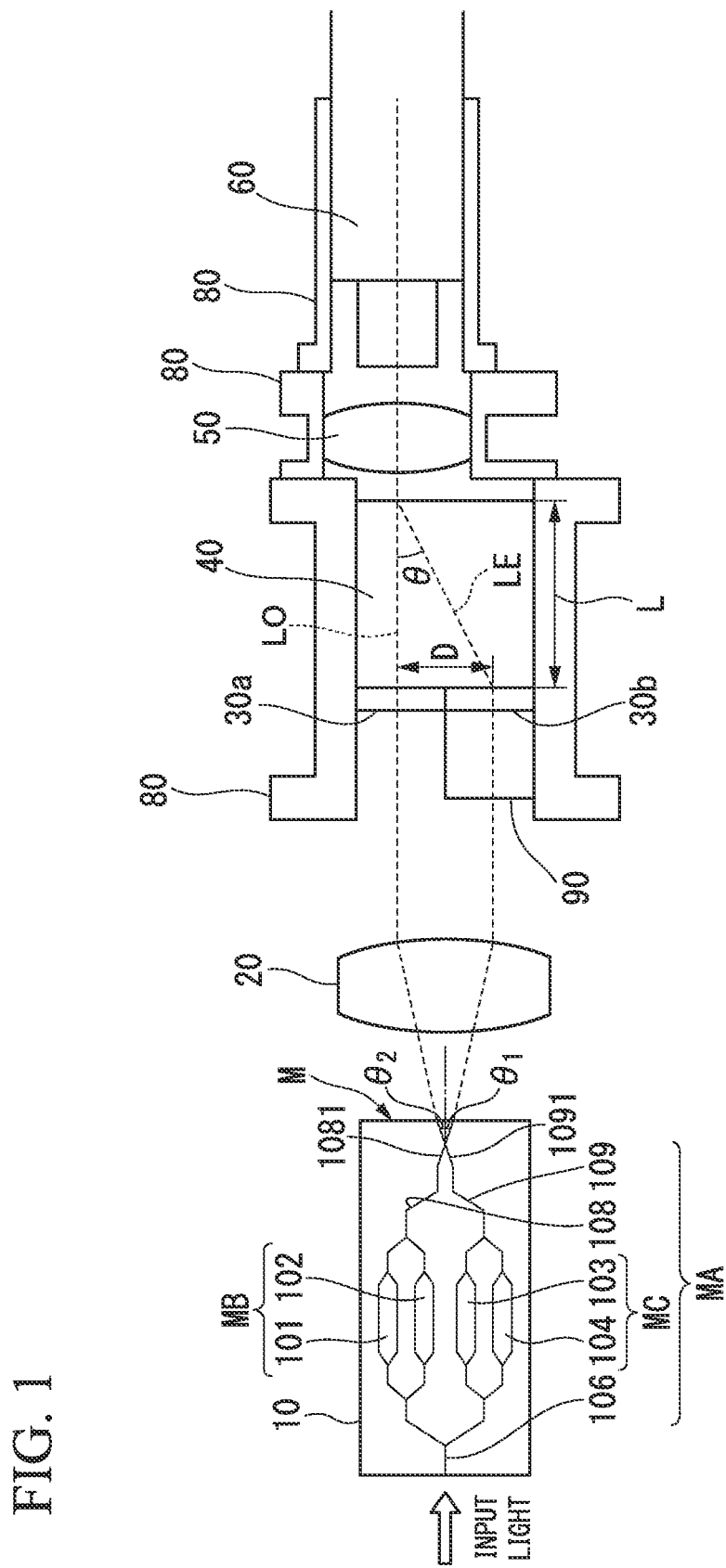
FIG. 1 is a top view showing the configuration of an optical modulator according to an embodiment of the invention.
Figure 2:
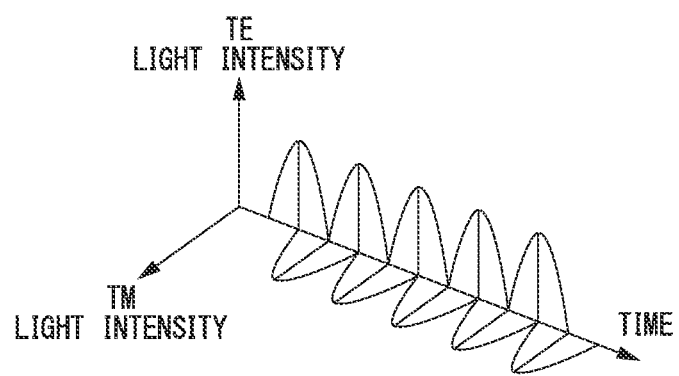
FIG. 2 is a diagram showing modulated light beams which are obtained from a polarization beam combining element and bit-interleaved with the planes of polarization thereof orthogonal to each other.

FIG. 1 is a top view showing the configuration of an optical modulator according to an embodiment of the invention. An optical modulator 1 is a polarization beam combining type modulator which polarizes and combines two modulated light beams. The optical modulator 1 has a modulator body 10 which modulates an input light beam, a lens 20 which collimates light beams outgoing from the modulator body 10 and converts optical paths such that the optical axes are in parallel to each other, a phase delay element 90 which applies a phase delay to one of two light beams outgoing from the lens 20, a half-wave plate 30a which rotates the polarized wave of the other one of the two light beams (a light beam having not passed through the phase delay element 90) outgoing from the lens 20, a glass plate 30b which has the same optical path length as the half-wave plate 30a, a polarization beam combining element 40 which combines (performs polarization combine) light beams of different polarized waves outgoing from the half-wave plate 30a and the glass plate 30b such that the optical paths thereof are aligned with each other, a lens 50 which condenses the light beam outgoing from the polarization beam combining element 40 at an incident position of an output optical fiber 60, and an output optical fiber 60 which extracts the combined light beam.

The modulator body 10 and the lens 20 are fixed in a housing 70. The phase delay element 90, the half-wave plate 30a, the glass plate 30b, the polarization beam combining element 40, the lens 50, and the output optical fiber 60 are accommodated in a cylindrical housing 80 and unitized.

The modulator body 10 is an optical waveguide element (LN optical modulator) in which an optical waveguide and a modulation electrode are formed on a lithium niobate ($LiNbO_3$: called LN) substrate.

The optical waveguide of the modulator body 10 has a nested structure in which Mach-Zehnder waveguides MB and MC are provided on both arms of a Mach-Zehnder waveguide MA, Mach-Zehnder waveguides 101 and 102 are provided on both arms of the Mach-Zehnder waveguide MB, and Mach-Zehnder waveguides 103 and 104 are provided on both arms of the Mach-Zehnder waveguide MC. That is, the input light beam to the modulator body 10 is introduced to an input waveguide 106 of the Mach-Zehnder waveguide MA and branches off into the Mach-Zehnder waveguides MB and MC on the arms. Light input to the Mach-Zehnder waveguide MB branches off into the Mach-Zehnder waveguides 101 and 102, and the light beam input to the Mach-Zehnder waveguide MC branches off into the Mach-Zehnder waveguides 103 and 104. The output light beams from the Mach-Zehnder waveguides 101 and 102 are multiplexed by the Mach-Zehnder waveguide MB and introduced to an arm 108 of the Mach-Zehnder waveguide MA. The output light beams from the Mach-Zehnder waveguides 103 and 104 are multiplexed by the Mach-Zehnder waveguide MC and introduced to an arm 109 of the Mach-Zehnder waveguide MA.

The Mach-Zehnder waveguides 101 to 104 form an LN optical modulator along with the modulation electrodes provided therein. For example, a driving signal of 25 Gb/s is applied from a driving circuit (not shown) to the modulation electrodes of the LN optical modulators 101 to 104, and the LN optical modulators 101 to 104 output modulated light beams which are modulated at 25 Gb/s. Here, as the modulation system of the LN optical modulators 101 and 102 of the Mach-Zehnder waveguide MB, DQPSK (differential quadriphase shift keying) is used. The same applies to the modulation system of the LN optical modulators 103 and 104 of the Mach-Zehnder waveguide MC. With DQPSK, the light beams introduced to the arms 108 and 109 of the Mach-Zehnder waveguide MA become modulated light beams of 50 Gb/s.

The arm 108 of the Mach-Zehnder waveguide MA is provided such that a portion (output waveguide 1081) near one end surface M of the LN substrate (modulator body 10) is at an angle $\theta_1$ relative to the normal to the end surface M. Similarly, the arm 109 of the Mach-Zehnder waveguide MA is provided such that a portion (output waveguide 1091) near the end surface M is at an angle $\theta_2$ relative to the normal to the end surface M. The angles $\theta_1$ and $\theta_2$ are angles at which the arm 108 and the arm 109 intersect each other inside the LN substrate. With this waveguide arrangement, the light beam exited obliquely downward from the output waveguide 1081 in FIG. 1, and the light beam exited obliquely upward from the output waveguide 1091 in FIG. 1. The output waveguides 1081 and 1091 are provided obliquely to the end surface M, thereby reducing feedback light beams from the end surface M to the output waveguides 1081 and 1091.

In the lens 20, the focal length $f_1$ and the arrangement (the distance between the lens 20 and the outgoing end of each of the output waveguides 1081 and 1091, and the optical axis direction of the lens 20) such that two light beams outgoing from the output modulator body 10 (output waveguides 1081 and 1091) are collimated and the propagation directions of the two light beams having passed through the lens 20 are parallel to each other. As described above, since the light beam incident on the lens 20 travels obliquely to the optical axis of the lens 20, with the adjustment of the focal length $f_1$ and the arrangement of the lens 20, it is possible to make outgoing light beams from the lens 20 parallel to each other. Therefore, a prism for converting an optical path is not necessary, thereby reduction in the number of components and reduction in size.

The focal length of the lens 20 is $f_1=1.8$ mm. The reason is as follows. If the focal length is long, (1) the distance between the modulator body 10 and the lens 20 is extended against the reduction in size and (2) the diameter of a collimated light beam increases, resulting in deterioration in polarization crosstalk described below. If the focal length is short, (3) the effective length when a light beam is regarded as a collimated light beam is shorter than the thickness L of the polarization beam combining element 40, making it difficult to completely combine the outgoing light beams from the polarization beam combining element 40.

The phase delay element 90 is arranged on the optical path of the light beam outgoing from the output waveguide 1081 from among the two parallel light beams having passed through the lens 20 (only the light beam outgoing from the output waveguide 1081 passes through the phase delay element 90, and the light beam outgoing from the output waveguide 1091 does not pass through the phase delay element 90). Accordingly, only the light beam outgoing from the output waveguide 1081 is given a phase delay according to the thickness (the length of the light propagation direction) of the phase delay element 90.

The half-wave plate 30a rotates the plane of polarization of the light beam outgoing from the output waveguide 1091 from among the two parallel light beams having passed through the lens 20 by 90°. The glass plate 30b applies the same phase delay as the phase delay applied to the light beam outgoing from the output waveguide 1091 by the half-wave plate 30a to the light beam outgoing from the output waveguide 1081 (the light beam having passed through the phase delay element 90) (without changing the plane of polarization). Accordingly, the lightbeam outgoing from the half-wave plate 30a and the light beam outgoing from the glass plate 30b are in a state where the planes of polarization are orthogonal to each other (inclined at 90°).

The polarization beam combining element 40 is a birefringent medium (for example, rutile or calcite) which is formed in a flat plate shape. The polarization beam combining element 40 sets the direction of the optical axis such that the light beam which passes through the half-wave plate 30a and is incident on the polarization beam combining element 40 (the outgoing light beam from the output waveguide 1091) propagates through the polarization beam combining element 40 as a normal light beam LO, and the light beam which passes through the glass plate 30*b* and is incident on the polarization beam combining element 40 (the outgoing light beam from the output waveguide 1081) propagates through the polarization beam combining element 40 as an abnormal light beam LE. Accordingly, two light beams which are outgoing from the half-wave plate 30*a* and the glass plate 30*b* and incident at different incident positions of the polarization beam combining element 40 are outgoing on the same optical path.

A combined phase delay of the phase delay by the phase delay element 90 and the phase delay by the optical path difference in the polarization beam combining element 40 is generated between two light beams with polarized waves orthogonal to each other outgoing from the polarization beam combining element 40 on the same optical path. This phase delay (the combined phase delay of the two phase delays) is adjusted to a phase delay corresponding to half the time for one bit of the modulated light beam outgoing from each of the output waveguides 1081 and 1091. Specifically, the thickness of the phase delay element 90 may be determined in accordance with the thickness of the polarization beam combining element 40 determined as described below such that the above condition (half-bit phase delay) is satisfied. In this way, in the optical modulator 1 of this embodiment, a half-bit delay is applied between the polarized waves outgoing from the polarization beam combining element 40 by both the phase delay element 90 and the polarization beam combining element 40. Accordingly, modulated light beams of 100 Gb/s which are bit-interleaved from the modulated light beams of 50 Gb/s with the planes of polarization orthogonal to each other as shown in FIG. 5 are obtained from the polarization beam combining element 40. With this configuration, since the phase delay applied by the polarization beam combining element 40 is small, it becomes possible to use a smaller polarization beam combining element 40.

The lens 50 has a focal length $f_2$, and condenses the light beam (collimated light beam) having passed through the polarization beam combining element 40 at the focal position. The output optical fiber 60 is arranged such that the core end surface on the incident side is at the focal position of the lens 50. Accordingly, the light beam from the polarization beam combining element 40 is coupled to the output optical fiber 60, combined and bit-interleaved, and a modulated light beam of 100 Gb/s is extracted to the outside as the output of the optical modulator 1.

Next, a configuration for reducing the size of the optical modulator 1 and obtaining a satisfactory polarization crosstalk characteristic will be described.

In the optical modulator 1 of FIG. 1, the propagation direction of the abnormal light beam LE propagating through the polarization beam combining element 40 is inclined at an angle θ according to the birefringence of the polarization beam combining element 40 (the difference between the refractive index $n_o$ for the normal light beam and the refractive index $n_e$ for the abnormal light beam) relative to the propagation direction of the normal light beam LO. At this time, if the clearance D between the two light beams (parallel light beams) with polarized waves orthogonal to each other and incident on the polarization beam combining element 40 from the half-wave plate 30*a* and the glass plate 30*b* is D (see FIG. 1), the thickness L of the polarization beam combining element 40 (the length of the propagation direction of the normal light LO, see FIG. 1) necessary when the two light beams pass through the polarization beam combining element 40 and exit onto the same optical path (that is, perform polarization combine) is expressed by L=D/tan θ. From the above expression, the smaller the clearance D, the smaller the thickness L of the polarization beam combining element 40 is made.

The incident light beams to the polarization beam combining element 40 (the half-wave plate 30*a* and the glass plate 30*b*) are collimated by the lens 20 and have a finite diameter. For this reason, if the clearance D is excessively small, the two incident light beams overlap each other. Meanwhile, it is assumed that the distance between the centers of the beams is defined as the clearance D. Then, part of the light beam from the output waveguide 1081 is incident on the half-wave plate 30*a* and part of the light beam from the output waveguide 1091 is incident on the glass plate 30*b* as unwanted leak light. For this reason, when the clearance D between the two light beams incident on the polarization beam combining element 40 is small, polarization crosstalk between two polarized waves in the outgoing light beam of the polarization beam combining element 40 is deteriorated.

Accordingly, in the optical modulator 1 of this embodiment, in order to prevent deterioration in polarization crosstalk, the lower limit value of the thickness L of the polarization beam combining element 40 is set such that the clearance D is not excessively small. Specifically, the thickness L of the polarization beam combining element 40 is set within a range in which polarization crosstalk is greater than the minimum value which is allowable as the transmission characteristic of the optical modulator 1.

Although the embodiment of the invention has been described in detail with reference to the drawings, a specific configuration is not limited to that described above, and various design changes or the like may be made without departing from the spirit and scope of the invention. Modifications will be described below.

The angles $θ_1$ and $θ_2$ between the output waveguides 1081 and 1091 and the normal to the end surface M of the LN substrate may be set such that the closer to the end surface M, the smaller the distance between the arms 108 and 109 (the output waveguides 1081 and 1091 do not intersect each other inside the LN substrate), the outgoing light beams from the arms 108 and 109 may intersect each other outside the modulator body 10.

The half-wave plate 30*a* and the glass plate 30*b* maybe bonded to the end surface M on the outgoing side of the modulator body 10.

The rotation angle of the plane of polarization by the half-wave plate 30*a* may be 45°, and instead of the glass plate 30*b*, a half-wave plate which rotates the plane of polarization by 45° in an opposite direction to the rotation direction of the plane of polarization of the half-wave plate 30*a* may be used, such that the planes of polarization of two light beams may be in a state of being relatively inclined at 90° by this half-wave plate and the half-wave plate 30*a*.

Although the optical modulator 1 of FIG. 1 has the configuration of a collimating optical system by the lenses 20 and 50, instead of the collimating optical system, the optical modulator 1 may have the configuration of a condensing optical system.

What is claimed is:

1. An optical modulator which makes polarized waves orthogonal to each other between light pulses corresponding to adjacent bits on a time axis, the optical modulator comprising:
    first and second light modulation unit which are driven with the same modulation frequency;
    an optical waveguide element which has a first waveguide through which a first modulated light beam by the first light modulation unit propagates and a second waveguide through which a second modulated light beam by the second light modulation unit propagates, the first waveguide being formed obliquely to an outgoing end surface, and the second waveguide being formed obliquely to both the first waveguide and the outgoing end surface;

a lens which makes parallel optical paths of the first modulated light beam outgoing from the first waveguide and the second modulated light beam outgoing from the second waveguide;

a phase delay element which applies a phase delay to at least one of the first and second modulated light beams;

a polarization beam rotating unit which rotates at least one polarized wave of the first and second modulated light beam to make the polarized waves orthogonal to each other between the two modulated light beams; and a polarization beam combining element which is provided at the back of the lens, and combines the first modulated light beam and the second modulated light beam whose polarized waves are made orthogonal to each other, wherein the thickness of the phase delay element in the light propagation direction is set to a thickness at which a light pulse of the first modulated light beam and a light pulse of the second modulated light beam by a phase difference due to the phase delay element and a phase difference due to the polarization beam combining element are bit-interleaved.

2. The optical modulator according to claim 1,
wherein the phase delay element has a flat plate shape and is configured to adjust the inclination angle of the normal of the flat plate relative to the light propagation direction.

3. The optical modulator according to claim 1,
wherein the thickness of the polarization beam combining element in the light propagation direction is set to be greater than a thickness corresponding to a minimum allowable value of polarization crosstalk on the combined beam between the first and second modulated light beams.

4. The optical modulator according to claim 1, further comprising:
a unit in which the optical waveguide element and the lens are fixed in a first housing; and
a unit in which the phase delay element, the polarization beam rotating unit, and the polarization beam combining element are fixed in a second housing along with an output optical fiber.

5. The optical modulator according to claim 1, further comprising:
a unit in which the optical waveguide element, the polarization beam rotating unit, and the phase delay element are fixed in a first housing; and
a unit in which the lens and the polarization beam combining element are fixed in a second housing along with an output optical fiber.

* * * * *